(12) United States Patent
Ullrich et al.

(10) Patent No.: US 9,233,676 B2
(45) Date of Patent: Jan. 12, 2016

(54) METHOD FOR OPERATING A BRAKE SYSTEM, BRAKE SYSTEMS IN WHICH THE METHOD IS CARRIED OUT AND MOTOR VEHICLES COMPRISING SAID BRAKES SYSTEMS

(75) Inventors: Thorsten Ullrich, Gernsheim (DE); Christian Albrich von Albrichsfeld, Darmstadt (DE); Jürgen Karner, Frankfurt (DE); Jochen Führer, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 341 days.

(21) Appl. No.: 13/819,119

(22) PCT Filed: Sep. 1, 2011

(86) PCT No.: PCT/EP2011/065157
§ 371 (c)(1),
(2), (4) Date: Apr. 15, 2013

(87) PCT Pub. No.: WO2012/028700
PCT Pub. Date: Aug. 3, 2012

(65) Prior Publication Data
US 2013/0211685 A1    Aug. 15, 2013

(30) Foreign Application Priority Data
Sep. 3, 2010    (DE) .................. 10 2010 040 190

(51) Int. Cl.
| B60T 13/58 | (2006.01) |
| B60T 1/10 | (2006.01) |
| B60T 8/26 | (2006.01) |
| B60T 8/32 | (2006.01) |

(Continued)

(52) U.S. Cl.
CPC ............... *B60T 13/586* (2013.01); *B60T 1/10* (2013.01); *B60T 8/267* (2013.01); *B60T 8/3275* (2013.01);
(Continued)

(58) Field of Classification Search
CPC ......... B60T 1/10; B60T 8/267; B60T 8/3275; B60T 13/686; B60W 10/08; B60W 10/188
USPC ................................................ 701/22, 70, 78
See application file for complete search history.

(56) References Cited

U.S. PATENT DOCUMENTS

| 5,326,158 A | 7/1994 | Ohori et al. |
| 5,853,229 A | 12/1998 | Willmann et al. |

(Continued)

FOREIGN PATENT DOCUMENTS

| CN | 101687498 | 3/2010 |
| DE | 19604134 | 8/1997 |

(Continued)

OTHER PUBLICATIONS
Chinese Office Action mailed Oct. 27, 2014 for Chinese Application No. 2011800527692.
(Continued)

*Primary Examiner* — Kim T Nguyen
(74) *Attorney, Agent, or Firm* — RatnerPrestia

(57) ABSTRACT

A method for the operation of a brake system having two brake circuits, with a recuperative brake, in particular an electrical generator, a master brake cylinder and a brake pedal simultaneously achieve optimized use of the regenerative braking and a constant braking experience for the driver with the highest safety requirements. When there is a braking demand by the driver with an associated desired braking torque and a first condition is met, at least one outlet valve is opened and brake fluid is conducted with an associated volume of brake fluid into at least one reservoir and the at least one outlet valve is then closed if a second condition is met. The first condition is met if a braking variable corresponding to the braking demand is not less than a specified minimum value. The second condition is met if the volume of brake fluid has flowed into the reservoirs.

15 Claims, 4 Drawing Sheets

(51) Int. Cl.
  *B60T 8/40* (2006.01)
  *B60T 8/48* (2006.01)
  *B60T 13/68* (2006.01)
  *B60W 10/08* (2006.01)
  *B60W 10/188* (2012.01)
  *B60W 30/18* (2012.01)

(52) U.S. Cl.
  CPC ............. *B60T 8/4077* (2013.01); *B60T 8/4081* (2013.01); *B60T 8/4872* (2013.01); *B60T 13/686* (2013.01); *B60W 10/08* (2013.01); *B60W 10/188* (2013.01); *B60W 30/18127* (2013.01); *B60T 2270/402* (2013.01); *B60T 2270/604* (2013.01); *B60W 2540/12* (2013.01)

(56) References Cited

U.S. PATENT DOCUMENTS 8,123,310 B2 2/2012 Haupt et al.
2009/0302673 A1 12/2009 Linhoff
2010/0241330 A1 9/2010 Hartmann
2011/0248559 A1 10/2011 Vollert et al.

FOREIGN PATENT DOCUMENTS

| DE | 10 2006 055 766 | 10/2007 | | |
|----|-----------------|---------|---|---|
| DE | 10 2006 055 765 | 1/2008 | | |
| DE | 10 2006 055 799 | 5/2008 | | |
| JP | 2002-255018 | * | 9/2002 | ................ B60L 7/10 |
| WO | WO2004/101308 | 11/2004 | | |
| WO | WO2010/069659 | 6/2010 | | |

OTHER PUBLICATIONS

International Search Report corresponding to application No. PCT/EP2011/065157, dated Nov. 18, 2011.
German Search Report corresponding to application No. DE 10 2010 040 190.0.

* cited by examiner

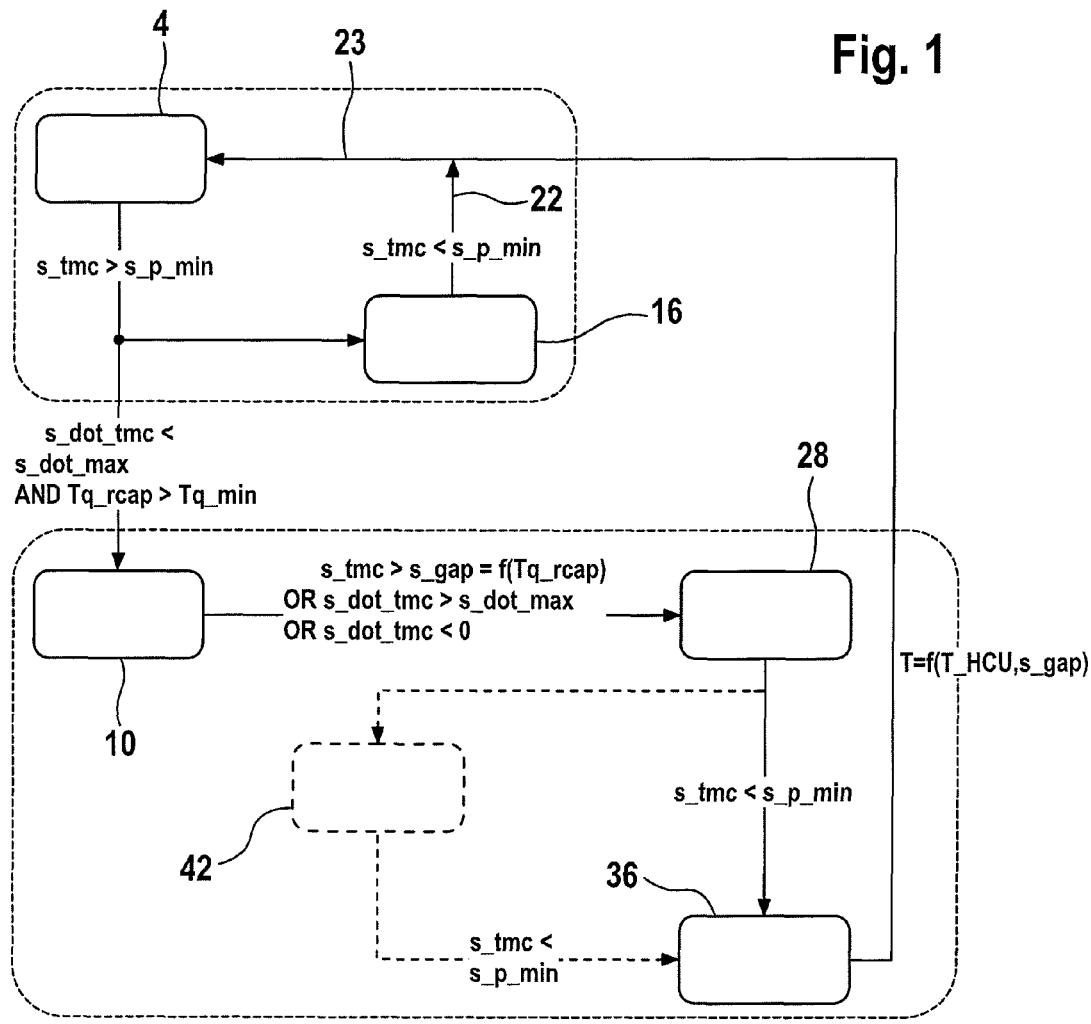
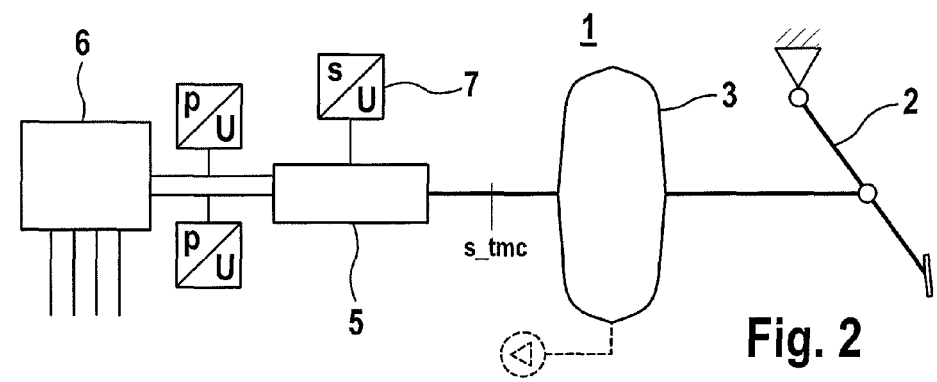

METHOD FOR OPERATING A BRAKE SYSTEM, BRAKE SYSTEMS IN WHICH THE METHOD IS CARRIED OUT AND MOTOR VEHICLES COMPRISING SAID BRAKES SYSTEMS

CROSS REFERENCE TO RELATED APPLICATIONS

This application is the U.S. National Phase of PCT International Application No. PCT/EP2011/065157, filed Sep. 1, 2011, which claims priority to German Patent Application No. DE 10 2010 040 190.0, filed Sep. 3, 2010, the contents of such applications being incorporated by reference herein.

FIELD OF THE INVENTION

The invention relates to a method for the operation of a brake system having two brake circuits, having a regenerative brake, in particular an electrical generator, a master brake cylinder and a brake pedal. It further relates to associated brake systems and a motor vehicle.

BACKGROUND OF THE INVENTION

The electric motor is gaining increasing importance as a replacement for or as a complement to internal combustion engines for driving motor vehicles. This is happening inter alia because of the environmental compatibility and the energy efficiency. The electric motor has still further advantages compared to the internal combustion engine, e.g. the full availability of the torque at low revolution rates and the lower noise generation.

The electrical energy that is required during operation of the motor vehicle is usually stored in batteries or accumulators. Said accumulators can e.g. be charged at charging stations provided especially for this purpose through a connection to the power supply system. A disadvantage with purely electrically powered vehicles is reduced range in comparison to motor vehicles that are powered by internal combustion engine. Mechanisms are usually therefore provided, with which the motor vehicle can be supplied with electrical energy or with which the batteries can be recharged even while in running operation. This is e.g. possible by means of the partial recovery of the kinetic energy during deceleration of the vehicle. The electric motor is operated as a generator during this. In this way the net traveling time, during which the motor vehicle can be operated purely electrically, increases. However, even in systems, e.g. hybrid systems, in which the electric motor is acting as a complement to an internal combustion engine, this type of energy regeneration can be usefully employed.

In addition to the recuperative energy generation and the resulting braking of the motor vehicle, conventional operating brakes are also provided for such vehicles, which have two separate associated brake circuits. Said operating brakes can e.g. be of hydraulic, electrohydraulic or electromechanical design. Their presence is on the one hand important in driving situations or operating situations in which the target braking torque intended by the driver exceeds the braking torque actually available from the generator. On the other hand, even if the generator fails or in situations in which the generator cannot supply any significant braking torque, safe and timely braking of the motor vehicle must be guaranteed.

Regenerative brake systems for recuperative regeneration of energy can be implemented in technically different ways. For example, such a brake system can be designed as an electrohydraulic brake system having two brake circuits and respectively associated hydraulic operating brakes, wherein the brake pedal is connected to an actuating unit and wherein a hydraulic control and regulating unit is provided, which conducts brake fluid into the operating brakes in the event of a braking demand by the driver.

Modern brake systems contain further extended functionalities, e.g. such as an anti-lock brake system (ABS) and/or an electronic stability program (ESP), by means of which pressure can be built up and reduced in a controlled manner in the individual brakes, whereby the vehicle can be stabilized during braking or if there is a danger of skidding.

In order to implement such functionalities, the brake system usually comprises at least one volume reservoir for brake fluid, which is normally in the form of a low pressure reservoir. Furthermore, valves are provided, by means of which brake fluid can be drawn from the brakes into the corresponding low pressure reservoir in a controlled manner, whereby the brake pressure is reduced. Hydraulic pumps are usually used for the active recovery of said volume of brake fluid.

In order to utilize the maximum available generator braking torque with such a brake system and hence also the maximum possible energy yield, the operation of the brake pedal must be decoupled from direct control of the wheel brakes. This relates to vehicles with a full or partial electric drive, which is designed for energy generation by means of regenerative brakes. Design solutions for this purpose are already known, whose disadvantage however consists in that mechanical free travel is provided in the transmission between brake pedal and wheel brakes, which cannot be adapted to the actual generator braking effect and in particular is to be taken into account as a missing volume in the event of a fault in the brake system. Depending on the situation, i.e. depending on the vehicle speed, the desired braking torque and the currently available generator braking torque, this means inter alia that for the driver of the vehicle a different pedal displacement results for the desired braking torque. The driver can be confused by this, because depending on the driving situation the same operation of the brake pedal leads to different braking behavior of the vehicle.

SUMMARY OF THE INVENTION

An aspect of the invention provides a method for the operation of a brake system, with which an optimized use of the regenerative braking and a constant braking experience of the driver are simultaneously achieved with the highest safety requirements. Furthermore, an associated brake system and an associated motor vehicle will be specified.

In relation to the method, this is achieved according to an aspect of the invention in that at least one outlet valve is opened and brake fluid is conducted with an associated volume of brake fluid into at least one reservoir if a first condition is met in the event of a braking command by the driver with an associated desired braking torque, and then the at least one outlet valve is closed if a second condition is met, wherein the first condition is met if a brake parameter corresponding to the braking command is not less than a specified minimum value, and wherein the second condition is met if the volume of brake fluid has flowed into the reservoir.

An aspect of the invention is based on the consideration that for the optimal use of regenerative braking, i.e. braking by means of the electric motor operated as a generator, the brake pedal must be decoupled from direct engagement with the operating brakes. Only in this way can the maximum available generator braking torque be used. If such a decoupling does not occur, i.e., if braking also takes place with the operating brakes in parallel with the generator, the available generator braking torque cannot be used in the maximum possible way.

For conventional hydraulic brake systems, with which the driver actively conducts brake fluid into the brakes by operation of the brake pedal, there is an essentially fixed or constant relationship between the pedal displacement and the corresponding deceleration of the motor vehicle. By means of said constant relationship—which in this case is achieved by means of the method of construction of the brake system—the driver can, based on previous experience, cause the desired deceleration in a controlled manner by operating the brake pedal.

If in the event of regenerative braking the brake pedal is decoupled from the operation of the operating brakes and the electric motor is used for braking, i.e. no fluid is transported into the wheel brakes by the operation of the brake pedal, without suitable measures for the driver there is no constant relationship between brake pedal displacement and the vehicle deceleration, especially if there is no dynamic allowance for the currently available generator braking torque. If the currently available braking torque from the generator has been used up the driver must be given the ability to continue to brake the vehicle by means of further operation of the brake pedal, e.g. hydraulically. With a design without dynamic adaptation to the available generator braking torque the pedal displacement that is traversed before the brakes are hydraulically operated is of different magnitude in the event of a different magnitude of the available generator braking torque. The driver can thereby be confused about the effectiveness of the brake pedal or can find it difficult to estimate how he must operate the brake pedal or must displace it in order to produce the desired braking torque in some driving situations.

As is now known, a substantially constant relationship between pedal displacement and nominal vehicle deceleration can be implemented during the entire braking process simultaneously with maximum use of the currently available generator braking torque, because brake fluid is displaced during the operation of the brake pedal even for a purely regenerative braking situation. Thus the braking effect of the generator can be fully utilized, but said brake fluid may not be conducted directly into the brakes. This can be avoided by conducting the brake fluid into a reservoir, wherein the volume of brake fluid introduced into the reservoir is dimensioned in a suitable manner. The start of the introduction and the end of the introduction of the brake fluid into the reservoir can be performed by opening or closing at least one outlet valve.

Said process should, however, not take place automatically during any braking process, but should be associated with certain conditions, which e.g. can depend on the desired braking torque, the current state of the brake system and the type of braking. The brake fluid should e.g. under certain circumstances not be conducted into the reservoir, but (also) into the brakes if the currently available braking torque from the generator is not sufficiently large. This can be achieved by a condition that is fulfilled if a braking variable corresponding to the braking demand is not less than a specified minimum value.

The time at which the at least one outlet valve is closed again, whereby the filling of the reservoir with brake fluid is ended, should also depend on various conditions. Said process should be terminated in any case if the desired volume of brake fluid has completely flowed into the reservoir.

Advantageously, the first condition is only met if the change of the braking variable with time does not exceed a specified maximum value. The displacement of the volume of brake fluid into the reservoir should not be carried out in this case. This is e.g. the case under emergency braking, i.e. if the vehicle is to be brought to a stop as quickly as possible. In this case it is advantageous to use the operating brakes to directly brake the motor vehicle in order to achieve maximum deceleration of the motor vehicle.

In a preferred embodiment of the method the first condition additionally only exists or is only met if the braking torque available by means of the generator is greater than a specified minimum generator braking torque. That means that the driver can only directly operate the operating brakes by operating the brake pedal for very low generator braking torque. The process of diverting brake fluid into the reservoir can thus be omitted because the operating brakes must be used in any case in the event of a desired braking torque that is significantly greater than the low braking torque deliverable by the generator.

If the desired braking torque exceeds the available generator braking torque at the start of braking, the operating brakes are advantageously operated and the volume of brake fluid is dimensioned in such a way that for the present displacement of the brake pedal the sum of the generator braking torque and the braking torque produced by the operating brakes corresponds to the braking torque of a conventional hydraulic brake system for the same pedal displacement.

The motor vehicle driver experiences exactly the same or essentially the same relationship between pedal displacement and braking torque or vehicle deceleration for such braking as for normal hydraulic braking. Despite a regenerative brake function, the effects of a certain pedal displacement are thus no different than for conventional braking. The driver thus does not have to get used to different behavior of the brake pedal with regard to the associated braking torque.

If the desired braking torque is less than the currently available generator braking torque, it is preferred if the anticipated rise of the generator braking torque during the course of braking is taken into account for the calculation of the volume of brake fluid. This is important because the available generator braking torque is speed-dependent, i.e. it depends on the speed of the motor vehicle. During the braking phase of a motor vehicle the generator can deliver more braking torque than at the start of the braking process in certain situations. This additional contribution is now taken into account during calculation of the volume of brake fluid. In this way a relationship between pedal displacement and deceleration can be produced in a very accurate manner, which substantially corresponds to equivalent hydraulic braking with the present braking torque.

In braking situations in which the desired braking torque that is demanded by the driver by operation of the brake pedal increases above the currently available braking torque from the generator, the operating brakes are advantageously operated. The braking torque that is delivered by the operating brakes in this case thus optimally corresponds to the difference between the desired braking torque and the braking torque currently deliverable by the generator. In this way the recuperative brakes are fully used, while the operation of the operating brakes ensures that the desired braking torque is achieved.

Following a braking process the brake fluid conducted into the reservoir must be fed back to the brake system so that the reservoir is again available at full capacity for subsequent regenerative braking and for ABS control braking. Advantageously, at least one electrical diverter valve is thus operated following the braking process and the brake fluid is conducted from the at least one reservoir back into at least one brake circuit. The operating time of the at least one electrical diverter valve is advantageously selected depending on the temperature and the volume of brake fluid stored in the reservoir.

Alternatively or in combination therewith, at a suitably selected point in time isolating valves are closed and a hydraulic pump is operated, whereby the brake fluid is conducted from the reservoir into the wheel brakes. At the same time the generator braking torque can be reduced. In this way a so-called "blending" between the braking torque generated by the generator and the braking torque generated by the operating brakes can be achieved, so that a constant braking torque is achieved for constant pedal displacement, wherein the respective component of the generator and operating brakes varies in time. This is advantageous e.g. for a braking process that proceeds until the vehicle is stationary.

Because of the reducing speed of the vehicle, the available generator braking torque also reduces. So that the same braking torque can nevertheless be maintained for constant pedal displacement until the vehicle is stationary, in this case the braking torque generated by the operating brakes is increased to the same extent that the braking torque generated by the generator decreases. In this way the driver does not notice the decrease in the generator braking torque. Without the measures described above, the driver would have to depress the brake pedal more in the event of decreasing generator braking torque in order to compensate for the decreasing braking torque.

In a preferred variant of the method, the braking variable is the travel of the piston in the master brake cylinder or the pedal displacement of the brake pedal. Both the travel and also the pedal displacement are suitable as a measure of the driver's braking demand or of the desired braking torque demanded by the driver.

The method described above is used in a preferred embodiment for the operation of an electrohydraulic brake system, wherein the operation of the brakes takes place hydraulically through operation of the brake pedal and/or through the operation of at least one hydraulic pump.

In an alternative, preferred embodiment of the method, the method is used for the operation of a brake-by-wire brake system, wherein the brakes are actively operated by a braking force booster. In another preferred embodiment the method is used for the operation of a combined brake system with electromechanical and hydraulic brakes.

With respect to the brake system, the above-mentioned object is achieved according to the invention by means of an electrohydraulic brake system comprising an electronic control and regulating unit, in which the above-mentioned method is implemented, wherein a low pressure reservoir is used as the reservoir, and by means of a brake-by-wire brake system, which comprises an electronic control and regulating unit in which an above-mentioned method is implemented, wherein a low pressure reservoir is used as the reservoir. It is also achieved by means of a combined brake system for a motor vehicle, wherein two electromechanically operable brakes are associated with the rear wheel axle and two hydraulic brakes are associated with the front wheel axle.

For all three types of brake system the same low pressure reservoir, which is used for ABS or ESP functionality, is preferably used for the implementation of the method. In this case no additional reservoir has to be installed.

With respect to the motor vehicle, the above-mentioned object is achieved according to the invention with one of the mentioned brake systems. On the one hand such a motor vehicle provides the driver with optimized comfort during braking, because he does not notice the interplay of the regenerative brake and the operating brakes during the braking process, so that he always experiences an essentially constant relationship between pedal travel or pedal displacement and the braking behavior of the vehicle. On the other hand the regeneratively generated braking torque is used in an optimized manner for energy regeneration, so that the motor vehicle can be operated in a particularly energy-saving and environmentally friendly manner.

The advantages of the invention consist in particular in that by means of the conduction of a volume of brake fluid into a reservoir during a recuperative braking process and the linking of said process to conditions that a variable corresponding to the braking demand is not less than a minimum value and that said braking variable is not subject to a sudden change, the driver experiences a normal or constant relationship between pedal displacement and deceleration during the recuperative braking process on the one hand, on the other hand that recuperative braking is only used in situations in which it makes sense for system-economic and safety-relevant aspects.

By means of the so-called "blending", i.e. the recovery of the volume introduced into the reservoir in the wheel brakes, a constant braking effect can be guaranteed even in the event of a loss of the braking torque produced by the generator, e.g. shortly before reaching the stationary state.

BRIEF DESCRIPTION OF THE DRAWINGS

The invention is best understood from the following detailed description when read in connection with the accompanying drawings. Included in the drawings is the following figures:

FIG. 1 a state diagram of a method for the operation of a brake system in a first preferred embodiment for an electrohydraulic brake system, FIG. 2 a system architecture of an electrohydraulic brake system forming the basis of the method according to FIG. 1, FIG. 3 a graphical illustration of the relationship between the available generator braking torque and the vehicle speed, FIG. 4 a graphical illustration of the ratio between the dynamic and the static dimensioning of an electrohydraulic gap depending on the available generator braking torque at the start of braking, FIG. 5 a state diagram of a method for the operation of a brake system in a second preferred embodiment for a brake-by-wire brake system, FIG. 6 a system architecture of a brake-by-wire brake system forming the basis of the method of FIG. 5, FIG. 7 an apparatus for decoupling pedal displacement and travel of a master brake cylinder for use in the system architecture of FIG. 6, and FIG. 8 an electrohydraulic brake system with a generator and an electronic control and regulating unit for implementing the method illustrated in FIG. 1.

Identical parts are provided with the same reference characters in all figures.

DETAILED DESCRIPTION OF THE PREFERRED EMBODIMENTS

Figure 3:
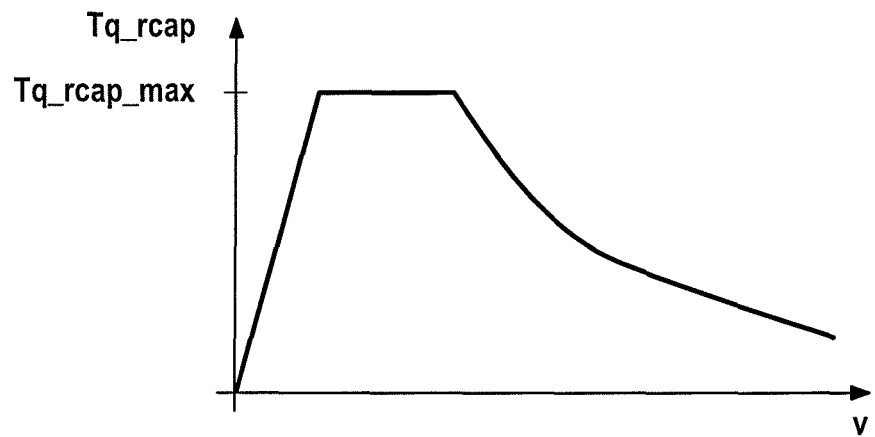

A method for the operation of a brake system in a first preferred embodiment for an electrohydraulic brake system is explained below using the state diagram shown in FIG. 1. An associated implementation of a conventional hydraulic brake system 1 according to the prior art with a brake pedal 2, a booster 3, a master brake cylinder 5 and a recuperative brake system 6 is illustrated in FIG. 2. The recuperative brake system 6 advantageously comprises hydraulic and electronic components for implementing an ESC (Electronic Stability Control) program. A displacement sensor 7 is provided for determination of the travel of the master cylinder 5.

The functionality or the process step of hydraulically implementing the free travel of the brake pedal necessary for regenerative braking by displacement of a volume of brake fluid into a reservoir is referred to below as an electrohydraulic gap or eGap. Said term is equally used for the braking volume displaced in this manner.

Starting from the ready state 4, in which the valves of the ESC system or of the brake system 1 are in the no-current state, a transition to the open state 10 occurs as soon as the travel s_tmc of the master brake cylinder 5, which is functioning as a braking variable, exceeds a minimum displacement s_p_min and additionally the rate of change of the travel of the master brake cylinder s_dot_tmc is less than a maximum threshold of s_dot_max and further a generator braking torque Tq_rcap of at least Tq_min (minimum generator braking torque) is available.

By means of the two additional conditions (maximum rate of change of the travel s_tmc and minimum available generator braking torque Tq_rcap>Tq_min) it is achieved that no activation of the electrohydraulic gap occurs if there is emergency braking (characterized by high acceleration of the brake pedal), and if only a low generator braking effect is available. If one of the additional conditions is not fulfilled when the travel threshold s_p_min is exceeded, the transition to the suspended state 16 occurs. Said suspended state 16 is only exited via arrow 22 on releasing the brake pedal, i.e. if the travel s_tmc of the master brake cylinder 5 is less than the associated travel threshold s_p_min. The brake system is thereupon changed to readiness for the next braking by the arrow 23 (transition to the initial ready state 4).

In the open state 10 the operation of outlet valves (OV), which are open in the no-current state, occurs, so that the volume of brake fluid displaced by the forward movement of the master brake cylinder does not pass into the wheel brakes but into the reservoir, which in the present example embodiment is in the form of a low pressure reservoir (LPR). However, depending on the level of the pressure setting of the LPR and the wheel brakes a reduction of the air gap at the wheel brakes is already taking place.

To reduce the switching cycles of the OV it is possible in each braking event to alternately operate only one OV in each of the two brake circuits.

The OVs are closed and the closed state 28 is achieved if the travel of the master brake cylinder reaches a threshold s_gap. The threshold s_gap is determined adaptively at the start of braking using the available generator braking torque at this point in time; this is further described more accurately below in the context of the dimensioning of the electrohydraulic gap.

The OVs are already closed prior to reaching the travel threshold s_gap if a rapid forward movement of the pedal is detected (emergency braking) or there is a rearward movement. In the latter case closing of the valves is necessary in order to prevent reverse flow through them.

In addition, for safety reasons a time limitation on the operation of the OV is implemented. Furthermore, the OV operation can be restricted to the case of forward movement of the brake pedal.

The closed state 28 is exited if the brake pedal is released, i.e. the travel s_tmc of the master brake cylinder is again less than the travel threshold s_p_min.

Following the braking, the volume of brake fluid displaced into the reservoir(s) must be returned to the master brake cylinder or the brake fluid container. Low pressure reservoir(s) (LPR) of the brake system, which e.g. is/are also used for ABS control, is/are used as the reservoir(s) in the present example embodiment. Electric diverter valves (EDV) that are open when not conducting current are operated for returning the brake fluid, so that depletion of the LPR can occur because of the spring system of the LPR piston. The EDV operation takes place in the depletion state 36, wherein the operation time of the EDV is selected as a function of the temperature and the volume stored in the LPR. This is characterized in FIG. 1 (and also FIG. 5) by the expression T=f(T_HCU, s_gap), wherein T refers to the operation time of the valves, T_HCU refers to the measured temperature of the brake fluid and s_gap refers to the volume of brake fluid. The operating time T is e.g. selected at lower temperatures to be longer than at high temperatures, because the viscosity of the brake fluid at low temperatures is greater than at higher temperatures. The brake fluid thus needs longer to flow from the reservoir back into the brake circuit because of its higher viscosity.

As an alternative to LPR depletion by operating the EDV, a volume delivery into the wheel brakes of the volume displaced into the LPR is also possible. This can be achieved by closing isolating valves (IV) and operating a hydraulic pump (the EDVs remain closed during this, so that only the volume present in the LPR is used). Said option, represented by the compensation state 42, has the advantage that the generator braking torque, which decreases at low vehicle speed and is completely absent when at rest, can be compensated by an active build-up of pressure. Without said active compensation the driver would have to balance the declining generator braking torque with increased operation of the brake pedal. This would not result in the constant relationship between pedal displacement and braking torque or deceleration.

Different requirements are placed on the dimensioning of said gap, i.e. on the dimensioning of the volume of brake fluid to be displaced. This takes place statically on the one hand, i.e. independently of the current braking process, and dynamically on the other hand, i.e. depending on parameters of the current braking process of the vehicle.

The static dimensioning is to a certain extent a limitation, i.e. it indicates the maximum volume to be displaced in the reservoir. The static dimensioning must on the one hand ensure that the residual capacity of the LPR is adequate for full use of the reservoir volume, in order to prevent locking of the wheels in the event of full braking and a subsequent sudden change of the road surface to a low coefficient of friction, i.e. for an abrupt decrease in pressure by the ABS function.

On the other hand the static dimensioning must be selected so that the braking effect caused by said travel of the master brake cylinder is consistent for the driver, i.e. that there is no detectable difference between the effect of the (in that case maximum) generator braking torque Tq_rcap_max and the braking torque resulting from the conventional operation of the hydraulic brake with the corresponding pedal displacement.

The dimensioning of the electrohydraulic gap takes place dynamically, i.e. at the point in time of the actual braking, using the respective available generator braking torque Tq_rcap and the braking demand or desired braking torque Tq_drv derived according to a characteristic from the displacement of the brake pedal (here with the same meaning as the travel of the master brake cylinder s_tmc).

If the available generator braking torque at the start of braking is less than a minimum value Tq_min, the activation of the electrohydraulic gap is entirely dispensed with.

If the braking demand exceeds the available generator braking torque Tq_rcap_0 at the start of braking, i.e.

Tq_drv≥Tq_rcap_0, the size of the electrohydraulic gap is dimensioned so that the generator braking effect is just compensated, i.e. so that for the current displacement of the brake pedal the same total braking torque (sum of generator braking torque and hydraulic braking torque) is set as for a conventional hydraulic brake system (without recuperative brake function by means of a generator).

However, if the braking demand or the desired braking torque Tq_drv is less than the available generator braking torque, i.e. Tq_drv<Tq_rcap_0, the size of the electrohydraulic gap can be dimensioned dynamically, so that the rise in the generator braking torque to be anticipated during braking is taken into account.

By way of explanation, reference is made to the principal dependence of the generator braking torque Tq_rcap on the vehicle speed v, which is illustrated in FIG. 3. The speed v is plotted on the abscissa and the generator braking torque Tq_rcap is plotted on the ordinate. Because of the power limit (power P=const), the generator braking torque is proportional to the inverse of the speed v. Thus the generator braking torque Tq_rcap rises with decreasing speed v up to a maximum value or maximum generator braking torque Tq_rcap_max. At low speed the torque Tq_rcap decreases and reaches zero when the vehicle is stationary, i.e. for v=0.

Figure 4:
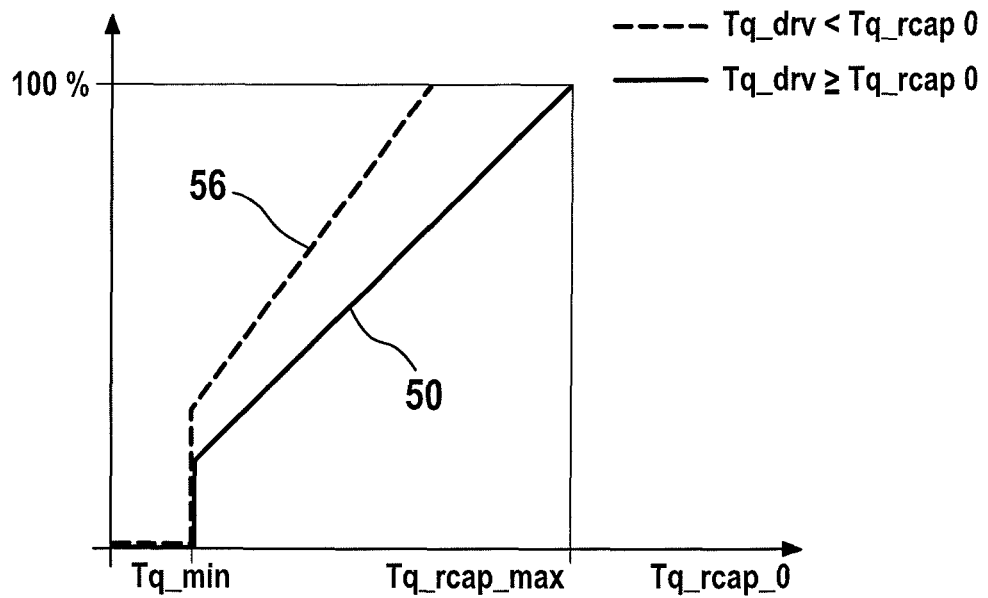

FIG. 4 shows the different cases of dynamic dimensioning of the electrohydraulic gap. The available generator braking torque Tq_rcap_0 at the start of braking is plotted on the abscissa and the ratio of the dynamically dimensioned gap to the statically dimensioned gap is plotted on the ordinate.

In general no activation of the eGap function takes place below a minimum value Tq_min of the available generator braking torque Tq_rcap_0 at the start of the braking, i.e. the dynamic value of the gap size is zero in that case.

If the demanded total braking torque exceeds the available generator braking torque Tq_rcap_0 at the start of the braking, the gap s_gap_dyn is dimensioned proportionally to Tq_rcap_0 and reaches 100% of the static value if Tq_rcap_0 equals the maximum value Tq_rcap_max that is taken into account during the design (first characteristic 50).

If the demanded total braking torque is less than the available generator braking torque Tq_rcap_0 at the start of braking, the gap is dimensioned to be larger and reaches the static value sooner, i.e. for smaller values of Tq_rcap_0 (second characteristic 56). As a result the fact is taken into account that an increase in the generator braking torque is to be expected as a result of the decreasing vehicle speed during braking.

Figure 5:
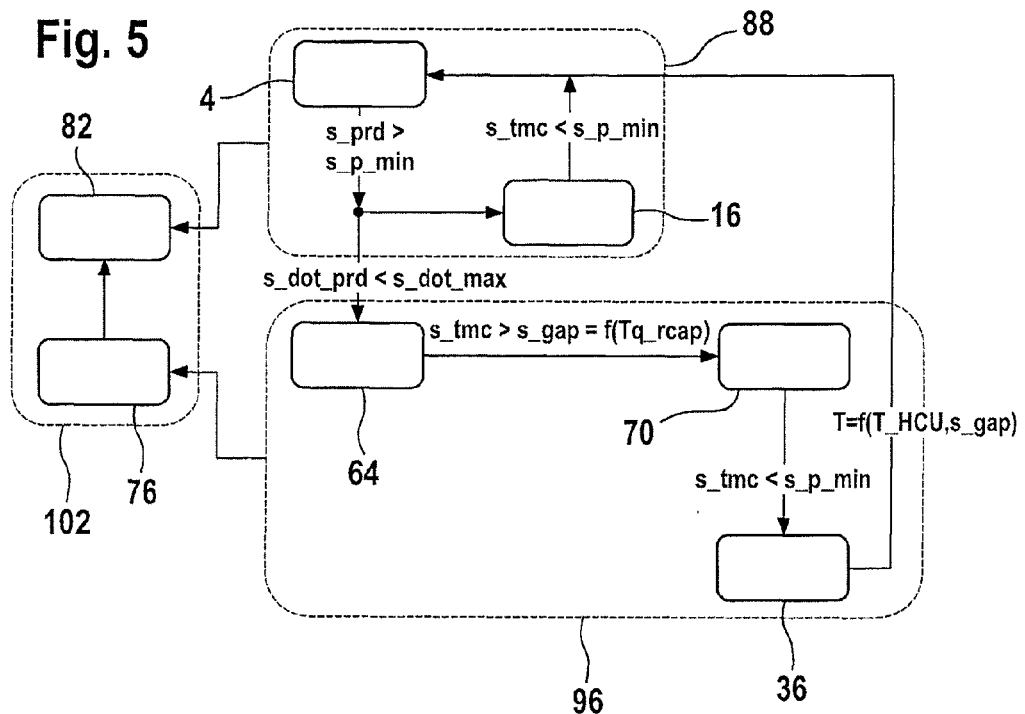

The method in another preferred embodiment for a brake-by-wire brake system is illustrated in a state diagram in FIG. 5.

Figure 6:
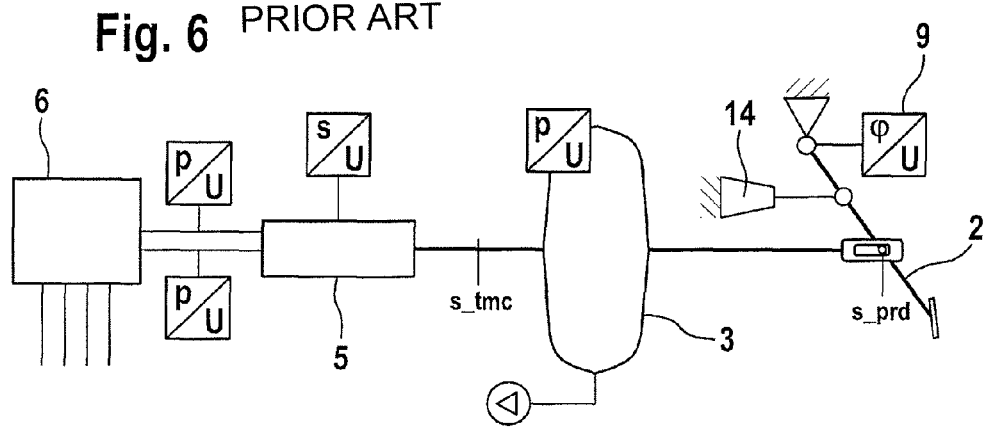

An associated system architecture according to the prior art is illustrated in FIG. 6. This provides the detection of the travel s_tmc of the master brake cylinder and in addition that of the pedal displacement s_prd. The braking variable by means of which the electrohydraulic gap is activated, i.e. which is decisive for conducting the volume of brake fluid into the reservoir, is in the present case the pedal displacement s_prd. The pedal displacement s_prd is detected by an angle sensor 9 on the brake pedal, whose signal is converted into the travel of the pedal rod to the master brake cylinder 5. The booster 3 is designed as an active booster, in the present case as a vacuum brake booster with an active control capability. The travel s_tmc of the master brake cylinder 5 can take place by a displacement sensor mounted directly on the master brake cylinder 5 or possibly alternatively by a membrane displacement sensor of the active booster.

Figure 7:
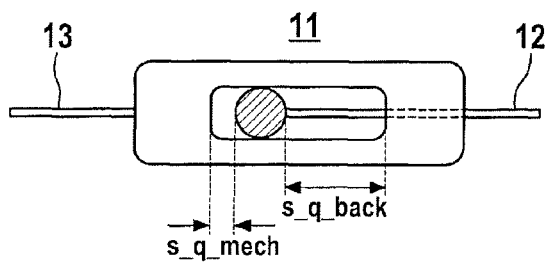

The mechanical decoupling of the brake pedal and the master brake cylinder is, for the brake system 1 shown in FIG. 6, carried out by a decoupling apparatus 11 illustrated in FIG. 7. It comprises a connection 12 to the brake pedal 2 and a connection 13 to the booster 3. The decoupling apparatus 11 implements a so-called rearward gap in the connection of the brake pedal, so that the master brake cylinder 5 can be moved by operating the active booster forwards (in FIG. 7 to the left) without exerting a reaction on the brake pedal 2. In addition to this a forward gap s_q_mech can be established. This can be selected depending on the design of the brake system and the response characteristic of the active braking force booster. The forward gap s_q_mech can thus also be set to zero. A counter-force is generated by means of a pedal simulator unit 14 during operation of the brake pedal 2. In this way a constant displacement-force characteristic can be established—in connection with the electrohydraulic gap—independently of the distribution between the generator brake and the hydraulic brake.

If the pedal displacement s_prd exceeds a pedal displacement threshold value s_p_min, the transition from the ready state 4 to the open state 64 occurs, as illustrated in FIG. 5. Depending on the selection of the mechanical gap, no displacement of the master brake cylinder 5 will still take place.

As an additional condition for the activation of the electrohydraulic gap the acceleration or the speed of the pedal displacement s_prd can also be used here and thereby in the event of emergency braking the electrohydraulic gap can be dispensed with. In this case the suspended state 16 is adopted until the brake pedal is released.

In the open state 64 the outlet valves (OV) are opened (this corresponds to the open state 16 for the embodiment of the method according to FIG. 1). In addition the active braking force booster is operated in such a way that the travel of the master brake cylinder s_tmc is adjusted to the specified size of the electrohydraulic gap. The size of the electrohydraulic gap can be set to be always the same using the maximum generator braking effect or adaptively—as explained in connection with the method according to FIG. 1.

As soon as the electrohydraulic gap has been adjusted the OVs are closed. Starting from this position of the master brake cylinder, a further build-up of pressure is possible by operating the active booster 3 and thus the so-called blending between the generator brake and the hydraulic brake is possible. The formation of the desired value (detection of driver demand) takes place continuously here using the pedal displacement s_prd.

Following the end of the braking, the depletion of the volume of brake fluid displaced into the LPR takes place by means of the EDV operation as explained in relation to the method according to FIG. 1.

In connection with brake-by-wire brake systems, the behavior in the event of a fault, i.e. if a fault occurs that forces the system to switch to a fallback mode, is of particular importance. Because of the generally larger dimensioning of the gap and the counter-force of the apparatus for pedal force simulation, achieving the auxiliary braking effect in the event of a fault is sometimes not possible without additional measures. The options of the eGap function when a system fault occurs that forces the system to exit by-wire operation are explained below.

Such a system fault can e.g. be the failure of the sensor system for the detection of the driver's braking demand, the operation of the active braking force booster, the electrical power supply or the electronic controller or the electronic control and regulating unit (ECU).

If the system fault occurs while the eGap function is passive (passive state 88) with the sub-states ready 4 and suspended 16, the eGap function is shut down, i.e. it will not be activated again, and the process passes into the disabled state 82. For the design of the fallback mode (auxiliary braking effect) there is no loss of travel to be taken into account apart from any existing mechanical gap s_g_mech.

If the system fault occurs while the eGap function is active—active state 96 with the sub-states open 64, opened 70 and depletion 36—two cases are to be distinguished.

If further operation of the valves and the hydraulic pump is still possible, the volume displaced into the LPR by the eGap function can be actively delivered into the wheel brake; this takes place in the elimination state 76. For this the hydraulic pump is operated with the isolating valves closed. Here the electrohydraulic gap is eliminated and thus the same conditions are produced as for the failure in the passive state.

If the operation of the valves and/or the hydraulic pump is no longer possible (e.g. if the system fault relates to the electrical power supply or the ECU), the electrohydraulic gap cannot be eliminated. In this case the system design must ensure the auxiliary braking effect taking into account any missing master brake cylinder displacement.

Figure 8:
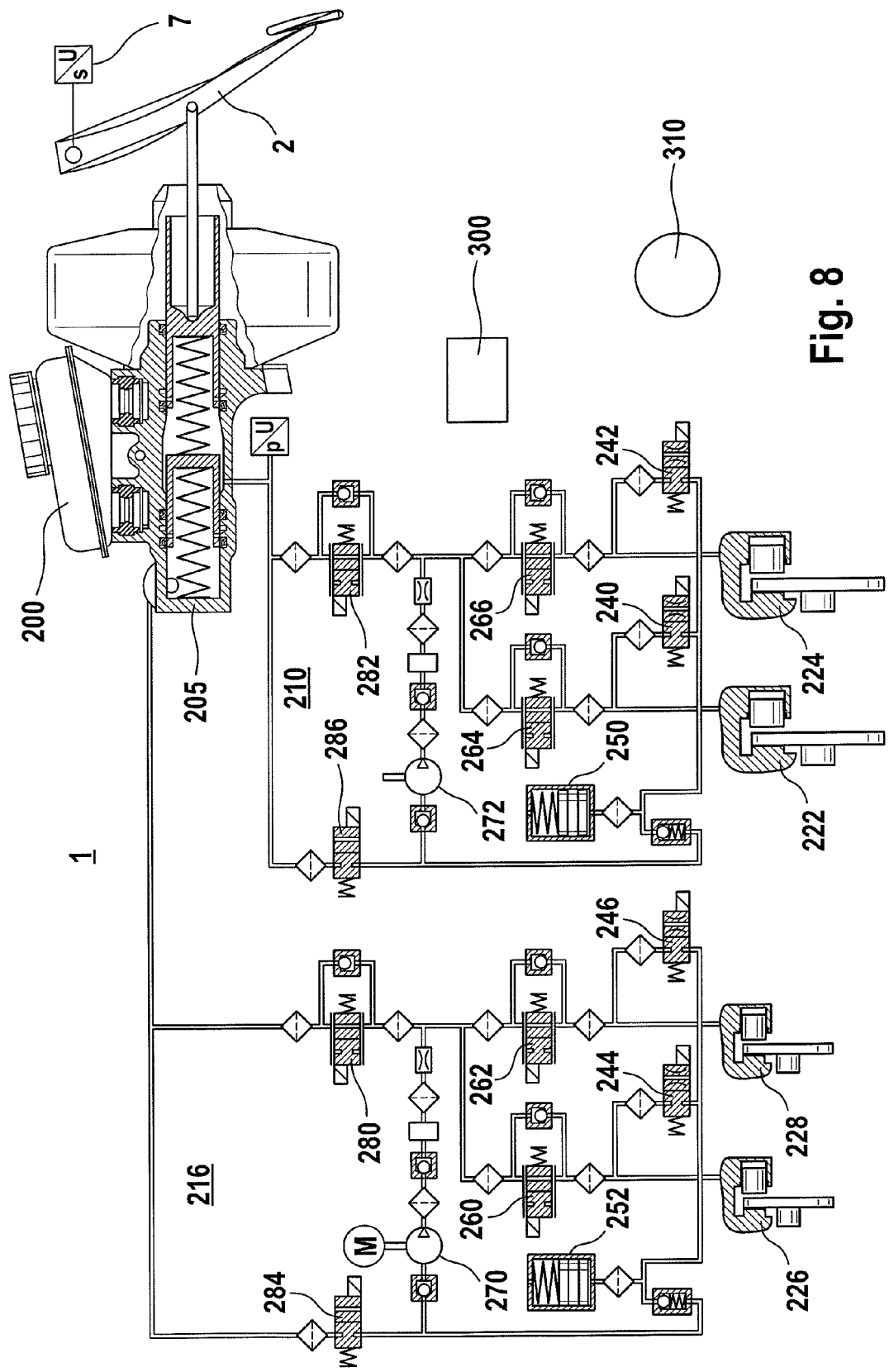

A brake system 1, which is designed as an electrohydraulic brake system, is illustrated in a preferred embodiment in FIG. 8. By means of a brake pedal 2 pistons are displaced in a tandem master brake cylinder (TMC) 205 in a known manner, whereby brake fluid is pushed into a first brake circuit 210 and a second brake circuit 216. A reservoir 200 for brake fluid is connected to TMC 205.

Two brakes 222, 224 are associated with the first brake circuit 210 and two brakes 226, 228 are associated with the second brake circuit. The two brakes 222, 224 are associated with the front wheels, the two brakes 226, 228 are associated with the rear wheels of a motor vehicle (not shown). The brake system 1 is accordingly of "black and white" design, which means that one brake circuit is associated with the front axle and one brake circuit is associated with the rear axle. Alternatively, the brake system 1 can also be implemented in "diagonal" form, wherein each brake circuit is associated with a rear wheel brake and a front wheel brake.

The brake system 1 comprises outlet valves (OV) 240, 242, 244, 246, by opening which brake fluid can be displaced into reservoirs 250, 252 (all valves are shown in the no-current state). Each of the two reservoirs 250, 252 is associated with a respective brake circuit 210, 216. The reservoirs 250, 252 are each in the form of a low pressure reservoir (LPR) and are suitable for known ABS systems. Whereas for exclusive use of the LPR in the context of an ABS the LPRs are only filled and/or emptied in rare cases—i.e. for brake pressure regulation by the ABS-System, this occurs significantly more often with the brake system according to the invention. Advantageously, LPRs with a long service life under high loads are therefore used. An ABS function is implemented in the brake system 1. A plurality of valves is provided in a known manner for this. For active supply of brake fluid, each brake circuit 210, 216 is equipped with a respective hydraulic pump 270, 272.

Each of the two brake circuits 210, 216 is provided in each case with an isolating valve (IV) 280, 282 and an electrical diverter valve (EDV) 284, 286. The control of valves 240, 242, 244, 246, 260, 262, 264, 266, 280, 282, 284, 286 and of the hydraulic pumps 270, 272 is carried out by means of an electronic control and regulating unit (ECU) 300.

The brake system 1 comprises a generator 310, with which the motor vehicle can be braked regeneratively or recuperatively. The ECU 300 is connected on the signal input side to the generator 310 and receives therefrom information about the braking torque currently available from the generator 310.

The ECU 300 is moreover connected on the signal input side to the displacement sensor 7. It is additionally or alternatively to this connected to another displacement sensor (not shown), which measures the travel s_tmc of the TMC.

The ECU 300 determines the driver's braking demand or the desired braking torque demanded by the driver during a motor vehicle braking process from the strength of operation of the brake pedal 2. If s_dot_tmc, the rate of change of s_tmc, is less than a specified s_dot_max and if the available generator braking torque Tq_rcap is greater than a minimum generator braking torque Tq_min, the OVs 240, 242, 244, 246, which are open when not carrying current, are operated so that the volume of brake fluid displaced by the TMC 205 is not displaced into the brakes 222, 224, 226, 228 but into the reservoirs 250, 252. To reduce the switching play of the OVs 240, 242, 244, 246, e.g. during braking, only one OV (240 or 242 and 244 or 246) can be alternately operated in each case in each of the two brake circuits 210, 216. Moreover the OVs of one of the brake circuits 210, 216 can also remain closed so that brake fluid is displaced into only one of the two reservoirs 250, 252.

If the travel of the TMC 205 reaches a threshold s_gap, the OVs 240, 242, 244, 246 (or a subset thereof) are closed. Under certain conditions said valves are already closed prior to this. This is e.g. the case under emergency braking, which is made noticeable by means of a rapid forward movement of the brake pedal 2. The closing of the OVs 240, 242, 244, 246 ensures that brake fluid is conducted directly and immediately into the brakes 222, 224, 226, 228 and the vehicle is thus decelerated (to the maximum possible extent). The OVs 240, 242, 244, 246 are also previously closed if there is a rearward movement of the brake pedal 2. This enables reverse flow through them to be prevented.

If the braking process is terminated, the volume of brake fluid displaced into the reservoirs 250, 252 must be pushed back into the TMC 205 or the reservoir 200. The EDVs 284, 286, which are open when not carrying current, are operated for this purpose. Because of the spring system of the reservoirs 250, 252 designed as LPRs, a depletion of reservoirs 250, 252 occurs.

Alternatively to the above-described depletion of the reservoirs 250, 252, the volume of brake fluid stored in the reservoirs 250, 252 can be displaced directly into the brakes 222, 224, 226, 228. The isolating valves 280, 282 are closed and the hydraulic pumps 270, 272 are operated for this purpose. The EDVs 284, 286 remain closed during this. Only the volume stored in the reservoirs 250, 252 is thereby displaced into the brakes 222, 224, 226, 228. In this way e.g. the braking effect can be maintained in situations in which the available generator braking torque Tq_rcap decreases. The ECU 300 controls the valves 280, 282 and the hydraulic pumps 270, 272 in such a way that the braking effect of the volume displaced into the brakes 222, 224, 226, 228 just compensates the decreasing generator braking torque. Therefore the decreasing braking effect of the generator does not lead to the driver having to adjust to a new and/or difficult-to-predict brake feel. Without this measure the driver would have to increase the pressure on the brake pedal 2.

As explained above, only subsets of the available valves, reservoirs and hydraulic pumps can also be used for the displacement of a volume of brake fluid.

LIST OF REFERENCE CHARACTERS 1 brake system
2 brake pedal
3 booster 4 ready state
5 master brake cylinder
6 recuperative brake system
7 displacement sensor
9 angle sensor
10 open state
11 decoupling apparatus
12, 13 connection
14 pedal simulator unit
16 suspended state
22, 23 arrow
28 closed state
36 depletion state
42 compensation state
50 first characteristic
56 second characteristic
64 open state
70 opened state
76 elimination state
82 disabled state
88 passive state
96 active state
102 malfunction state
200 reservoir
205 tandem master brake cylinder
210 first brake circuit
216 second brake circuit
222, 224 brake
226, 228 brake
240, 242 outlet valve
244, 246 outlet valve
250, 252 reservoir
260, 262 valve
264, 266 valve
270, 272 hydraulic pump
280, 282 isolating valve
284, 286 electrical diverter valve
300 electronic control and regulating unit
310 generator
s_tmc travel of the master brake cylinder
s_p_min minimum displacement
s_dot_tmc rate of change of the travel
s_dot_max maximum threshold
Tq_rcap generator braking torque
Tq_min minimum generator braking torque
s_gap threshold
Tq_rcap_max maximum generator braking torque
Tq_rcap_0 generator braking torque available at the start of braking
Tq_drv desired braking torque
v speed
s_prd pedal displacement
s_p_min threshold value of the pedal displacement
s_q_back rearward gap
s_q_mech forward gap

The invention claimed is:

1. A method for operating a brake system having two brake circuits, with a recuperative brake comprising an electrical generator, a master brake cylinder and a brake pedal, the method comprising:
opening at least one outlet valve so that brake fluid is conducted into at least one reservoir with an associated volume of brake fluid in an event of a driver's braking demand with an associated desired braking torque and if a first condition is met, and
closing the at least one outlet valve if a second condition is met,
wherein the first condition is met if a braking variable corresponding to the braking demand is not less than a specified minimum value, and if an available generator braking torque (Tq_rcap_0) available from the generator is greater than a specified minimum generator braking torque (Tq_min),
wherein the second condition is met if the volume of brake fluid has flowed into the reservoirs.

2. The method as claimed in claim 1, wherein the first condition is met if a change against time of the braking variable does not exceed a specified maximum value.

3. The method as claimed in claim 1, wherein, if the desired braking torque exceeds the available generator braking torque (Tq_rcap_0) at a start of braking, operating brakes of the brake system are operated and the volume of brake fluid is dimensioned in such a way that for a present displacement of the brake pedal a sum of a generator braking torque (Tq_rcap) and the braking torque generated by the operating brakes corresponds to the braking torque of a conventional hydraulic brake system for an equivalent pedal displacement.

4. The method as claimed in claim 1, wherein for decreasing generator braking torque isolating valves are closed and at least one hydraulic pump is operated and in this way the brake fluid is conducted from the reservoir into wheel brakes of the brake system.

5. The method as claimed in claim 1, wherein the braking variable is a travel (s_tmc) of a master brake cylinder or a pedal displacement (s_prd) of the brake pedal.

6. The method as claimed in claim 1, wherein the method is used for operating an electrohydraulic brake system, and wherein operation of the brake system takes place hydraulically by operation of the brake pedal and/or by operating at least one hydraulic pump.

7. An electrohydraulic brake system having two brake circuits and associated brakes, with a recuperative brake, comprising an electrical generator, a master brake cylinder and a brake pedal, a hydraulic control and regulating unit, with at least one reservoir and outlet valves, whose opening allows brake fluid to be conducted into the at least one reservoir, wherein the method as claimed in claim 6 is implemented in an electronic control and regulating unit and wherein the at least one reservoir is a low pressure reservoir.

8. A motor vehicle having a brake system comprising two brake circuits and associated brakes, with a recuperative brake, comprising an electrical generator, a master brake cylinder and a brake pedal, a hydraulic control and regulating unit, with at least one reservoir and outlet valves, whose opening allows brake fluid to be conducted into the at least one reservoir, wherein the method as claimed in claim 6 is implemented in an electronic control and regulating unit and wherein the at least one reservoir is a low pressure reservoir.

9. The method as claimed in claim 1, wherein the method is used for operating a brake-by-wire brake system and wherein brakes of the brake system are actively operated by a braking force booster.

10. A brake-by-wire brake system having two brake circuits and associated brakes, with a recuperative brake, in particular an electrical generator, a master brake cylinder and a brake pedal, with at least one reservoir and outlet valves, whose opening allows brake fluid to be conducted into the reservoir, wherein the method as claimed in claim 9 is implemented in an electronic control and regulating unit and wherein the at least one reservoir is a low pressure reservoir.

11. The method as claimed in claim 1, wherein the method is used for operating a combined brake system with two electromechanically operated brakes associated with a first vehicle axle and two hydraulic brakes associated with a second vehicle axle.

12. A combined brake system having two brake circuits, wherein a first brake circuit of the two brake circuits comprises two electromechanically operated brakes and a second brake circuit of the two brake circuits comprises two electro-hydraulically operated brakes, and with at least one reservoir, wherein the method as claimed in claim 11 is implemented in an electronic control and regulating unit, and for which the at least one reservoir is a low pressure reservoir.

13. A method for operating a brake system having two brake circuits, with a recuperative brake comprising an electrical generator, a master brake cylinder and a brake pedal, the method comprising:
opening at least one outlet valve so that brake fluid is conducted into at least one reservoir with an associated volume of brake fluid in an event of a driver's braking demand with an associated desired braking torque and if a first condition is met, and
closing the at least one outlet valve if a second condition is met,
wherein the first condition is met if a braking variable corresponding to the braking demand is not less than a specified minimum value,
wherein the second condition is met if the volume of brake fluid has flowed into the reservoirs, and
wherein, if the desired braking torque is less than a currently available generator braking torque ($Tq\_rcap\_0$), an increase in a generator braking torque ($Tq\_reap$) to be anticipated during braking is taken into account during a calculation of the volume of brake fluid.

14. A method for operating a brake system having two brake circuits, with a recuperative brake comprising an electrical generator, a master brake cylinder and a brake pedal, the method comprising:
opening at least one outlet valve so that brake fluid is conducted into at least one reservoir with an associated volume of brake fluid in an event of a driver's braking demand with an associated desired braking torque and if a first condition is met, and
closing the at least one outlet valve if a second condition is met,
wherein the first condition is met if a braking variable corresponding to the braking demand is not less than a specified minimum value,
wherein the second condition is met if the volume of brake fluid has flowed into the reservoirs, and
wherein following a braking process at least one electrical diverter valve is operated and the brake fluid is conducted from the at least one reservoir back into at least one brake circuit.

15. A method for operating a brake system having two brake circuits, with a recuperative brake comprising an electrical generator, a master brake cylinder and a brake pedal, the method comprising:
opening at least one outlet valve so that brake fluid is conducted into at least one reservoir with an associated volume of brake fluid in an event of a driver's braking demand with an associated desired braking torque and if a first condition is met, and
closing the at least one outlet valve if a second condition is met,
wherein the first condition is met if a braking variable corresponding to the braking demand is not less than a specified minimum value,
wherein the second condition is met if the volume of brake fluid has flowed into the reservoirs,
wherein following a braking process at least one electrical diverter valve is operated and the brake fluid is conducted from the at least one reservoir back into at least one brake circuit, and
wherein an operating time of the at least one electrical diverter valve is selected depending on a temperature and a volume of the brake fluid stored in the reservoir.

* * * * *